United States Patent [19]

Copening

[11] 4,415,366
[45] Nov. 15, 1983

[54] LIGHTWEIGHT CEMENT SLURRY AND METHOD OF USE

[75] Inventor: Ward L. Copening, Parrish of Orleans, La.

[73] Assignee: The Dow Chemical Company, Midland, Mich.

[21] Appl. No.: 420,655

[22] Filed: Sep. 21, 1982

Related U.S. Application Data

[63] Continuation of Ser. No. 241,339, Mar. 6, 1981, abandoned.

[51] Int. Cl.$^3$ .............................................. C04B 15/02
[52] U.S. Cl. ........................................ 106/86; 106/87; 106/88; 106/90; 106/110; 166/293; 166/294
[58] Field of Search ................................... 106/86–88; 166/293, 294

[56] References Cited

U.S. PATENT DOCUMENTS

| 3,583,172 | 6/1971 | Koudelka et al. | 106/88 |
| 3,959,003 | 5/1976 | Ostroot et al. | 166/293 |
| 4,045,236 | 8/1977 | Bianchi | 106/88 |
| 4,234,344 | 11/1980 | Tinsley et al. | 106/88 |
| 4,235,291 | 11/1980 | Messenger | 166/293 |

*Primary Examiner*—James Poer
*Attorney, Agent, or Firm*—J. B. Guffey

[57] ABSTRACT

A foamed, thixotropic hydraulic cement slurry and method of using same in cementing subterranean voids. This lightweight cement slurry is particularly useful for cementing in oil or gas wellbores penetrating a weak underground formation which will be broken by cement slurries of ordinary density.

23 Claims, No Drawings

LIGHTWEIGHT CEMENT SLURRY AND METHOD OF USE

This is a continuation of application Ser. No. 241,339, filed Mar. 6, 1981, now abandoned.

BACKGROUND OF THE INVENTION

The invention is a lightweight cement slurry and a method of using same to fill a subterranean void. The slurry is particularly useful in the oil and gas well cementing art in weak formations.

Previously, foaming of cement slurries as a method of lightening such slurries for use in oil and gas wells has been discussed but has previously found little or no practical application. Thixotropic cement slurries have been utilized extensively in the process of cementing wellbores in oil and gas wells but prior hereto, it is not believed that a foamed thixotropic cement slurry has been utilized or suggested for this purpose.

SUMMARY OF THE INVENTION

The invention is a foamed, hydraulic cement slurry comprising an aqueous, thixotropic slurry of hydraulic cement in which is dispersed, as discrete, stable bubbles, a gas or mixture of gases. The foamed cement slurry is preferably comprised of a Portland cement and preferably also comprises a surfactant in an amount sufficient to permit the major portion of the bubbles of the foamed slurry to remain as discrete entities until the slurry has hardened. These bubbles preferably have an average diameter of about 1.5 millimeter or less. The thixotropic properties of the cement slurry are preferably imparted by the inclusion of sufficient calcium sulfate hemihydrate to impart thixotrpy to the slurry. The invention also consists of a method of filling a subterranean void by placing in such a void the foamed hydraulic cement slurry of the invention and thereafter permitting the slurry to harden.

In a preferred method, the void to be filled by said foamed slurry comprises at least a portion of a wellbore penetrating a subterranean formation and such a method is suitably employed in the completion of oil and gas wells.

DETAILED DESCRIPTION OF THE INVENTION

The foamed thixotropic cement slurry of the invention is prepared by formulating preparing a thixotropic cement slurry and after said slurry is mixed injecting surfactant and a gas or mixture of gases into the prepared slurry in the prescribed amounts.

A thixotropic slurry is a slurry which mixes easily and is initially relatively thin but which rapidly increases in viscosity, both at mixing temperature and at the temperature at which it will be employed, as the shear rate of the slurry approaches zero. The viscosity increase of a thixotropic cement slurry will occur repeatedly until the actual beginning of initial set, as the shear rate is alternatively increased and decreased. Thixotropic cement slurries are described in U.S. Pat. Nos. 3,563,313; 3,804,174; 3,847,635; and 3,835,926. Certain cement slurries called "gel" cements which contain bentonitic clays and the like such as described in U.S. Pat. No. 3,227,213 may be employed if they truly meet the above definition of a thixotropic slurry. The teachings of the foregoing patents are hereby incorporated by reference.

Preferred, however, for use in the present invention is a thixotropic cement slurry prepared as described in U.S. Pat. Nos. 3,563,313 by the addition of suitable amounts of calcium sulfate hemihydrate to conventional hydraulic cement slurries. The amounts of calcium sulfate hemihydrate suitable for this use are about 10 to about 160 parts by volume, preferably less than 100 and more preferably less than 20 parts per 100 parts of the dry hydraulic cement component which preferably comprises a Portland cement. More preferably, the Portland cement employed is high in $C_3A$ content. Such high $C_3A$ cements are API Class A cements or ASTM Type I cements.

Another preferred thixotropic slurry may be prepared by adding a liquid thixotropy-imparting agent to a conventional hydraulic cement slurry which agent is made up of a mixture of iron (II) sulfate and aluminum sulfate. A thixotropic cement slurry of this nature is suitably prepared by making a concentrate of about 33 parts (weight) $Al_2(SO_4)_3 \cdot 18H_2O$, 4.5 parts (weight) $FeSO_4 \cdot 7H_2O$ and 3 parts (weight) sulfuric acid and about 60 parts (weight) water and then adding 35 liters of this solution to 315 liters of water and blending with 500 kilograms of API Class G Portland cement.

Conventional cement additives may generally be employed in preparing the thixotropic hydraulic cement slurry. For example, calcium chloride may be added beneficially to accelerate the strength development of the final cement. Conventional fluid loss additives will not normally be necessary because of the thixotropic nature of the slurry. The use of dispersants should generally be avoided since their action will often destroy the thixotropic properties of the slurry.

As previously noted, the thixotropic slurry is prepared and, while it is still relatively nonviscous, it is pumped from the mixing tank to the subterranean void in which it is to be employed. At a point downstream from the pump or other transfer means employed, the gas is added to the cement slurry. This point is sufficiently far upstream from the void to permit adequate mixing of the gas and the cement slurry in the line prior to emplacement in the void. The addition of the gas or mixture of gases into a line is suitably accomplished by injecting same at a T connection. When surfactant is employed, the addition of surfactant to the slurry mixing tank should generally be avoided since it will cause air to be entrained in the mixing process making the thus foamed slurry more difficult to pump.

The gas to be employed is suitably any gas which does not interfere with the setting process of the cement slurry. Suitably nitrogen, carbon dioxide or air may be employed in this capacity as may any other inert gas. The use of nitrogen or air or mixtures thereof is preferred because of their ready availability in most oil and gas field locations.

It is often desirable to include a surfactant in the cement slurry to which the gaseous component is added. This surfactant helps to stabilize the foam and prevent the merging of the individual bubbles which would cause large airpockets to be formed with resultant loss of strength in the hardened cement. When a surfactant is employed, it is added to the cement slurry after it has been mixed because its presence in the slurry while mixing would cause the entrainment of large volumes of air which would make the slurry more difficult to pump and might result in inaccurate measurement of the volume of gas entrained. Consequently, the surfactant is suitably added to the line carrying the cement slurry downstream of the mixing tank preferably prior to the introduction of the gas into the line. A suitable arrangement is to inject the surfactant at a measured rate into the line on the suction side of a pump used to transfer the cement slurry and the gaseous material is then metered into this slurry containing the surfactant at a point downstream from the pump.

The surfactant to be employed is suitably any surfactant which forms stable foam in the cement slurry. Preferably, the surfactant forms stable foams in aqueous solutions having a pH of about 12 or greater. The amount of surfactant to be employed is suitably about 0.1 to about 2 parts per 100 parts of water by volume. Preferably, about 0.5 to about 1.5 parts surfactant is employed. Greater or lesser quantities may be utilized of course but generally the ranges specified will be suitable for the intended use. Inspection of a cross-sectional area of the hardened thixotropic foamed cement will reveal minute bubbles where the gas has been entrained in the slurry. Inspection under a microscope of compositions of the invention prepared as described reveals that a majority of the bubbles have a diameter of less than about 1.5 millimeter. Preferably, the mixture of components is adjusted so that the average diameter of these bubbles is less than about 1 millimeter and more preferably less than about 0.5 millimeter.

Suitable surfactants may be either anionic, cationic, nonionic or amphoteric in nature. Examples of suitable surfactants are: an adduct of ethylene oxide to di-sec. butyl phenol where the number of ethylene oxide units per mole of the phenol ranges from about 5 to 15; cetyl trimethyl ammonium bromide; or a mixture of about 1 part cocobetaine with one part of a polypropyleneglycol of molecular weight of about 400 in about 1 part of a 1:4 isopropanol to water mixture (all parts by volume). One of the best surfactants for use in the instant invention, however, is about a 75:25 (volume) mixture of two commercial surfactants sold as Arquad C/50 and Aromox C/12 Respectively, the first is about a 50 percent active solution of trimethyl cocoammonium chloride and the second is about a 50 percent active solution of bis (2-hydroxyethyl) cocoamine oxide.

To prepare the foamed cement slurry of the invention, a base thixotropic cement slurry is prepared and in it is entrained a calculated volume of the desired gas which volume of gas will be compressed under conditions of use to a second known volume which will give a foamed cement of the density desired for the application. In order to calculate the amount of gas which should be entrained at the surface one back calculates from the desired downhole density using basic elemental physical relations derived from the ideal gas law; i.e. from the equation $[(P_s V_s)/T_s] = [(P_d V_d)/T_d]$. $P_s$ is the known pressure of the gas at surface conditions, $V_s$ is the volume of gas to be added to the slurry at the surface, and $T_s$ is the temperature of the gas at the surface and where $P_d$ is the hydrostatic head of pressure on the foamed slurry at a given depth, $V_d$ is the desired volume of gas at the indicated depth and $T_d$ is the downhole temperature at the desired depth. From this equation, the unknown factor $V_s$ may be calculated since $P_s$ and $T_s$ are known at the surface and since $T_d$ is approximated by the known bottom hole circulating temperature of a well or void to be cemented. $P_d$ may be controlled by preceding the foamed cement slurry by a liquid of known density when an annular cement job is done or by following the foamed slurry with a liquid of known density when a plug is to be set in a void bearing the weight of this liquid since the pressure $P_d$ applied will be the hydrostatic head of such a column of liquid. $V_d$ will be a known quantity calculated to provide a foamed slurry of desired density at the given depth when the density of the base slurry which is to be foamed is already known.

For example, when a 9 pound per gallon (ppg) foamed slurry is desired at a given depth, and a 15 ppg base thixotropic cement slurry is to be employed, the volume of gas to be added to the slurry at the surface may be calculated from the foregoing equation as follows: 0.6 gallons of the 15 ppg slurry will provide a weight of 9 pounds and a resultant foamed slurry of approximately 9 ppg if the remaining 0.4 gallon is void space taken up by the gas. Accordingly, for each 6 gallons of 15 ppg base slurry to be pumped downhole, 4 gallons (downhole volume) of the gas will need to be added. Using 4 gallons as $V_d$ and knowing $T_d$, $P_d$ the hydrostatic head on the foam at that depth, as well as $P_s$ and $T_s$ at the surface, $V_s$ the volume of gas to be added at the surface for each 6 gallons of cement slurry may be calculated.

As a base thixotropic slurry, it is desirable to employ an aqueous slurry where the parts of solids per 100 parts water range from about 20 to about 100 parts, preferably from about 27 to about 100 parts, by volume. The amount of gas to be dispersed in the base slurry at a given downhole pressure and temperature, is suitably about 10 parts to about 220 parts per 100 parts water, by volume. Preferably the amount of gas at downhole conditions is about 45 to about 220 parts per 100 parts water, by volume. Since it is the volume of gas entrained in the foamed slurry under downhole conditions that is the important factor, when referred to herein and except where otherwise noted, reference to the volume of gas in a foamed thixotropic slurry is meant to be under downhole conditions of temperature and pressure. The amount of surfactant to be employed is suitably about 0.1 to about 2 parts, preferably greater than about 0.5 part and preferably less than about 1.5 part per 100 parts of water, by volume. As noted before, when a thixotropic slurry is prepared utilizing calcium sulfate hemihydrate, the amount of the hemihydrate is suitably about 10 parts to about 20 parts per 100 parts of hydraulic cement, by volume.

The method for placing the foamed, thixotropic cement slurry utilizes standard techniques for emplacement of cement slurries in subterranean voids. However, as noted above, the methods for the addition of surfactant and gas at the respective points in a slurry transport system differ from conventional cement slurry mixing and pumping methods. Additionally, a relatively slow pump rate and high back pressure will aid in preparing a homogeneous foam. To avoid uncontrolled foaming at the leading and the trailing edge of the cement slurry when pumped, it is advisable to precede and to follow the foamed slurry by a slug, e.g. one-half barrel, of the unfoamed base slurry.

EXAMPLE

In the following example, all parts are by volume unless otherwise noted.

The operator of an operation in Louisiana in a Gulf of Mexico coastal marsh drilling into a vugular limestone formation desired to set a cement plug in a 44.5 inch open borehole. The borehole would not stay filled with 8.4 lb/gal (ppg) brine, indicating severe lost circulation problems could be expected in setting a conventional cement plug.

It was decided to use a foamed, thixotropic cement slurry of the instant invention having a density of 9 ppg, at depth, for setting this plug.

A base slurry was prepared by blending 14 parts of calcium sulfate hemihydrate per 100 parts of Louisiana Coarse Grind Class A cement. About 2 percent calcium chloride (based on weight of cement) was added to accelerate the set time of the slurry. The base thixotropic slurry (unfoamed) of 14.6 ppg was prepared by mixing about 57 parts of the Class A-calcium sulfate hemihydrate blend with 100 parts water which was a bay brine of about 8.4 ppg density.

Approximately 1100 sacks of Class A cement were mixed to prepare the base slurry and an aqueous solution of a nonionic surfactant was added to the base slurry in the line between the mixing tub and the cement pump. This surfactant was an adduct of ethyleneoxide to di-sec. butyl phenol, having about 10 moles of oxyethylene moieties per mole of the phenol. The amount of the surfactant added was about 0.5 part per 100 parts water in the slurry.

At a "T" approximately 25 feet downstream from the cement pump, nitrogen gas was metered into the slurry which was being pumped at about 5–6 barrels per minute (bpm). The volume of nitrogen to be added was 34,000 standard cubic feet (scf). It was to be added to the slurry at a nominal rate of about 90–100 scf per barrel, or about 65 parts gas per 100 parts slurry at depth. However, it was subsequently discovered that due to equipment error, the nitrogen was pumped at a much faster rate. Consequently, the gas escaped from the slurry after placement and only 7 feet of fill was placed. "Soapy" bubbles were observed returning.

Another 950 sacks of the Class A hemihydrate blend (in the same ratio noted above) was mixed with suitable water to make up to the 14.6 ppg base slurry and nitrogen was introduced, nominally at 40–60 scf of nitrogen per barrel of slurry. It was ultimately determined that about 90–100 scf of nitrogen per barrel of slurry was added. This resulted in a foamed, thixotropic slurry of about 8.2–8.8 ppg density downhole.

It was later determined that approximately 140 feet of fill was obtained. This foamed, lightweight plug had sufficient strength to support a subsequent third stage of the unfoamed 14.6 ppg thixotropic slurry representing the desired amount of fill.

Use of foamed, thixotropic slurries of the invention reduces the migration of gas bubbles which can occur if a foamed slurry is prepared from a non-thixotropic conventional slurry. Such a migration of bubbles detrimentally affects the properties of the hardened cement derived from that slurry.

What is claimed:

1. A foamed hydraulic cement slurry comprising an aqueous, thixotropic slurry of hydraulic cement in which is dispersed, as discrete stable bubbles, a gas or mixture of gases and which comprises calcium sulfate hemihydrate in an amount sufficient to impart thixotropic properties to said slurry.

2. The foamed slurry of claim 1 wherein, by volume the parts of solids per 100 parts water range from about 20 to about 100.

3. The foamed slurry of claim 1 wherein, by volume, the parts of gas per 100 parts water range from about 10 to about 220.

4. The foamed slurry of claim 3 wherein the parts solids per 100 parts water range from about 20 to about 100.

5. The foamed slurry of claim 1 wherein, by volume, the parts of solids per 100 parts range from about 27 to about 100.

6. The foamed slurry of claim 1 wherein, by volume, the parts of gas per 100 parts water range from about 45 to about 220.

7. The foamed slurry of claim 1, 2, 3, 4, 5 or 6 wherein the hydraulic cement component comprises a Portland cement.

8. A foamed, hydraulic cement slurry comprising an aqueous, thixotropic slurry of hydraulic cement, comprising Portland cement and comprising calcium sulfate hemihydrate in an amount sufficient to impart thixotropic properties to said slurry, in which slurry a gas or mixture of gases is dispersed as discrete, stable bubbles, wherein the parts of solids and parts of gas per 100 parts of water, range, from about 27 and 45, respectively, to about 100 and 220, respectively, by volume.

9. The foamed slurry of claim 1 or 8 which comprises a surfactant which is present in an amount sufficient to permit the major portion of said bubbles to remain as discrete entitites until said slurry has hardened.

10. The foamed slurry of claim 1 or 8 which comprises a surfactant which is present, by volume, in an amount of about 0.1 part to about 2 parts per 100 parts water.

11. The foamed slurry of claim 1 or 8 which comprises a surfactant which is present, by volume, in an amount of about 0.1 part to about 2 parts per 100 parts water, and which is capable of forming a stable foam in an aqueous solution at a pH of about 12 or greater.

12. The foamed slurry of claim 1 or 8 wherein the major portion of said bubbles have an average diameter of about 1.5 millimeter or less.

13. The foamed slurry of claim 11 wherein the major portion of said bubbles have an average diameter of about 1.5 millimeter or less.

14. The foamed slurry of claim 13 wherein about 0.5 to about 1.5 part surfactant is present and the average diameter is about 1 millimeter or less.

15. The foamed slurry of claim 14 wherein said average diameter is about 0.5 millimeter or less.

16. The foamed slurry of claim 1 or 8 wherein the calcium sulfate hemihydrate is employed in an amount of from about 10 parts to about 160 parts per 100 parts of hydraulic cement, by volume.

17. A method of filling a subterranean void which comprises emplacing in said void a foamed hydraulic cement slurry of claim 1, 2, 3, 4, 5, 6 or 8, and thereafter allowing said slurry to harden therein.

18. The method of claim 17 wherein the foamed slurry comprises a surfactant which is present in an amount sufficient to permit the major portion of said bubbles to remain as discrete entities having an average diameter of about 1.5 millimeters or less.

19. The method of claim 18 wherein said surfactant is present, by volume, in an amount of about 0.1 part to about 2 parts per 100 parts water, and is capable of forming a stable foam in an aqueous solution at a pH of about 12 or greater.

20. The method of claim 19 wherein the hydraulic cement comprises a Portland cement.

21. The method of claim 19 wherein at least a portion of said void comprises at least a portion of a wellbore which penetrates a subterranean formation.

22. A foamed, hydraulic cement slurry comprising an aqueous, thixotropic slurry of hydraulic cement, comprising Portland cement and calcium sulfate hemihydrate, in which slurry a gas or a mixture of gases is dispersed as discrete, stable bubbles, wherein about 10 parts to about 20 parts calcium sulfate hemihydrate are present per 100 parts Portland cement; about 27 to about 100 parts solids and about 45 parts to about 220 parts gas are present per 100 parts of water; wherein the major portion of said bubbles have an average diameter of about 1 millimeter or less; and wherein a surfactant is present in an amount of about 0.5 part to about 2 parts per 100 parts water; all parts by volume.

23. A method of filling a subterranean void which comprises emplacing in said void a foamed, hydraulic cement slurry of claim 22 and thereafter allowing said slurry to harden therein.

* * * * *